No. 626,090.　　　　　　　　　　　　　　　　　　Patented May 30, 1899.
C. W. PARSONS, Dec'd.
A. L. PARSONS, Administratrix.
SHAKING SCREEN AND SEPARATOR.
(Application filed Jan. 19, 1898.)

(No Model.)　　　　　　　　　　　　　　　　　　2 Sheets—Sheet 1.

WITNESSES
D. B. Replogle
A. R. Simrell

INVENTOR.
Calvin W. Parsons

THE NORRIS PETERS CO., PHOTO-LITHO., WASHINGTON, D. C.

No. 626,090. Patented May 30, 1899.
C. W. PARSONS, Dec'd.
A. L. PARSONS, Administratrix.
SHAKING SCREEN AND SEPARATOR.
(Application filed Jan. 19, 1898.)
(No Model.) 2 Sheets—Sheet 2.
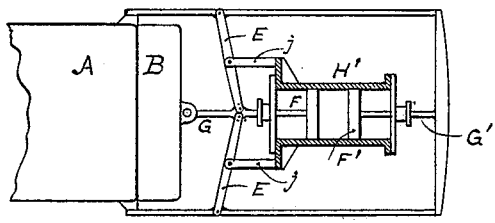
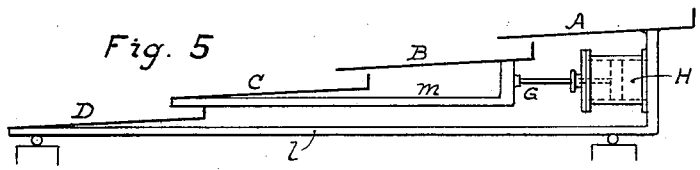
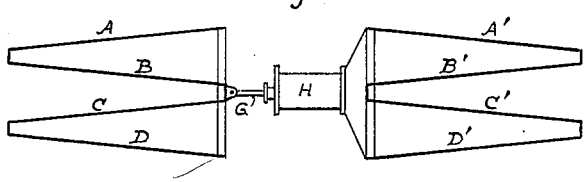
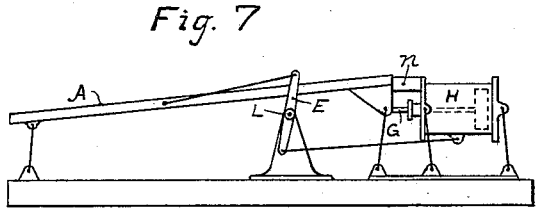
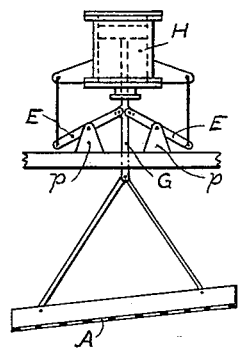
WITNESSES
INVENTOR
Calvin W. Parsons

UNITED STATES PATENT OFFICE.

CALVIN W. PARSONS, OF SCRANTON, PENNSYLVANIA; ABI L. PARSONS ADMINISTRATRIX OF SAID CALVIN W. PARSONS, DECEASED.

SHAKING SCREEN AND SEPARATOR.

SPECIFICATION forming part of Letters Patent No. 626,090, dated May 30, 1899.

Application filed January 19, 1898. Serial No. 667,148. (No model.)

*To all whom it may concern:*

Be it known that I, CALVIN W. PARSONS, a citizen of the United States, residing at Scranton, in the county of Lackawanna and State of Pennsylvania, have invented new and useful Improvements in Shaking Screens and Separators, of which the following is a specification.

The objects of this invention are, first, to balance the moving parts of shaking screens, separators, concentrators and jigs, having a vibrating or reciprocating motion, so that no vibration will be communicated to the floors or building to which they are attached; second, to improve the character of the movement given to the screening or jigging parts, making the reversal of the motion more abrupt than is the case where cranks or eccentrics are used for that purpose; third, to provide means for easily and quickly adjusting the speed of said machines. These objects are attained by means of the mechanism shown in the accompanying drawings, in which—

Figure 1:
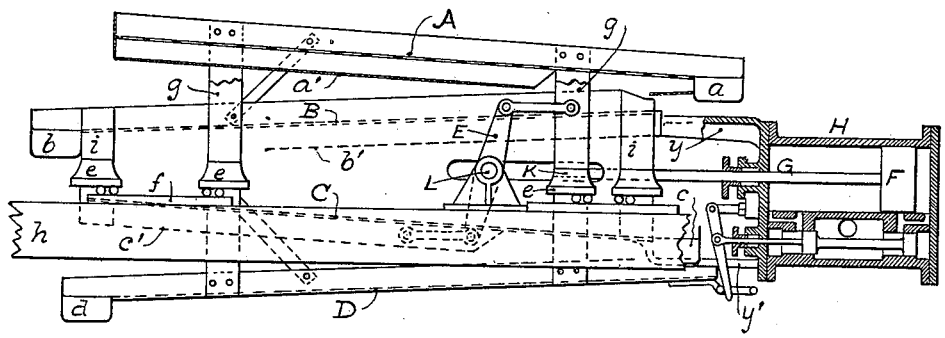
Figure 2:
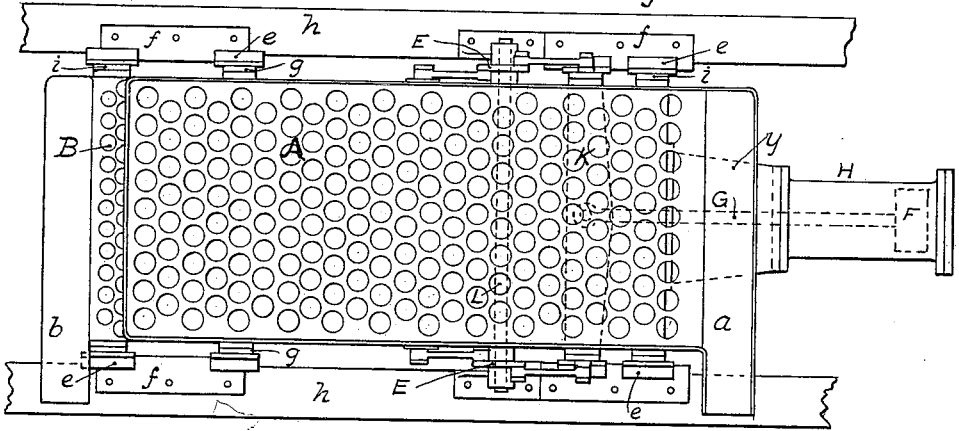
Figure 3:
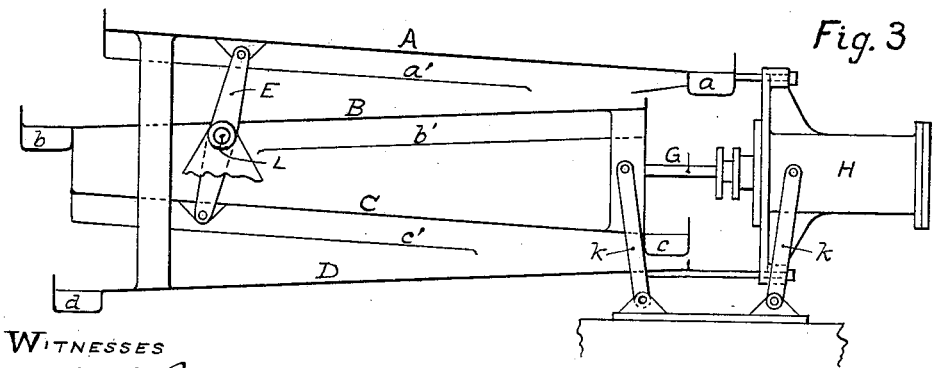

Figure 1 is a side elevation, partly in section, of a shaking-screen for coal in the preferred form. Fig. 2 is a top view of the same. Fig. 3 is a diagrammatic side view showing a modified construction. Fig. 4 is a sectional plan view or diagram showing a modification of the motor. Fig. 5 shows the arrangement of a set of tandem screens. Fig. 6 shows how two groups of screens may be shaken by one motor. Fig. 7 shows the arrangement of a single screen, the motor-cylinder being used for a counterweight; and Fig. 8 shows the application of my improved mechanism to a vertically-moving separator or coal-jig.

The screening devices used in connection with my invention are of the ordinary kinds, being plates of perforated metal or screens of woven wire. They are designated in the several views by the letters A B C D. In the preferred form, as adapted to screening coal, (shown in Figs. 1 and 2,) the top screen is of the coarsest mesh and the others are made successively finer. Each screen is inclined, so that the coal which fails to pass through the meshes will slide to the lower end of the screen and pass off through the delivery-chute *a*, *b*, *c*, or *d*, which is attached to it. The first three are also provided with plates *a'* *b'* *c'*, which serve to catch the material passing through the preceding screen and conduct it nearly to the head of the following screen. The four screens are rigidly connected into two groups, A and D constituting one group and B C the other. The vertical frame-bars *g*, which connect the top and bottom screens, pass down outside of the middle screens with sufficient clearance to permit the latter to move freely between them. The two groups of screens are supported independently upon the beams *h* by means of brackets *e*, which are attached to the upright frame-bars *g* and *i*. These brackets rest upon balls which roll upon race plates or tracks *f*. The group of outer screens are reciprocated upon these tracks by means of the cross-head K, connected to the uprights *g*, and the piston F upon the piston-rod G. This piston moves within the cylinder H. The group of inner screens is directly connected to the cylinder H by means of yoke-pieces *y* *y'*, and all reciprocate together as one piece. When steam or compressed air is admitted between the piston and one of the cylinder-heads, it tends to drive the piston one way and the cylinder the other. As both groups of screens are free to move upon their bearings, it follows that they will move in opposite directions simultaneously. In order to insure an equal movement of the screens relative to a fixed point, they are connected, as shown, to the opposite ends of equalizing-levers E. These levers vibrate upon a shaft L, which is secured to standards rigidly attached to the beams *h*. Thus the center of this shaft is a fixed point about which the two groups of screens, together with the cylinder and piston attached thereto, move oppositely and equally.

The gross weight of the groups, including their attachments and the probable weight of coal lying upon them when at work, is carefully equalized, so that the power required to move them shall be exactly the same. The inertia of the two groups being alike, the force of the steam will be exerted equally in opposite directions, and there being no unbalanced force the shaft L will receive no impulse tending to move it to either one side or the other; but if the screws are improperly loaded, or there is undue friction in some of the bearings, then a little more force must be exerted one way than the other, and the shaft L will receive a lateral push at each stroke, the force of the impulse being proportional to the difference in the weight or inertia of the two groups. Thus it becomes clear that so long as the screens are properly loaded and are otherwise in good order no jar or shake can be imparted to the beams which support the machine or to the building to which it may be attached.

The function of the levers E is merely to equalize the movements of the two sets of screens, and it is not intended that they should drive one group by force imparted from the other.

The cylinder H, together with its valves and valve-operating mechanism, resembles that of a common direct-acting steam-pump. In fact, the "steam end" of such a pump may be used to operate this machine without material alteration. The main ports are situated at some distance from the cylinder-heads, so that the piston will ride over and close them before reaching the end of its stroke, and the parts are brought to a stop by "cushioning" upon the steam thus trapped and compressed in the end of the cylinder, as is commonly done in that class of pumps. When the compression thus effected is considerable, the motion of the piston is arrested and reversed with great abruptness, although without a positive blow or shock. The character of the movement produced in this way is well adapted to the requirements of a shaking screen or separator, and is greatly superior to that produced by a crank or eccentric. In the latter case the motion is gradually accelerated from the beginning to the middle of the stroke and as gradually reduced from thence to the end. While in the former the motion is accelerated from the start until cushioning begins, the resistance then rises to a maximum in an exceedingly short space of time, and the motion is reversed so abruptly that the coal lying upon the screens is caused to slide upon them by its own momentum. The process of screening is thereby greatly facilitated.

The steam or compressed air is conveyed to the cylinder by a flexible pipe, which permits it to move without restraint. The speed of the machine can be instantly changed by adjusting the supply-valve. Thus if the coal comes into the screen in unusual quantities the capacity of the machine may be at once increased sufficiently to properly dispose of it by increasing the speed of reciprocation, or if the coal comes in wet or sticky with adhesive clayey matter the speed of the shaking motion may be increased to any extent necessary to shake it apart and separate it properly.

While the manner of supporting the screens which is shown in Figs. 1 and 2—that is, upon ball-bearings—is preferred to all others, yet other modes may be used if desired.

In Fig. 3 the screens are supported partly by attachment to the equalizing-levers E and partly upon swinging links $k$. The cylinder and piston are also connected to the screens in a different way.

In Fig. 4 two moving pistons are employed to move the screens, while the cylinder H' is stationary. In this case the equalizing-levers E lie in a horizontal plane and their fulcra are attached to the stationary cylinder. The shaft L and its standards, which are employed in Figs. 1 and 2, are omitted because their functions are performed by the cylinder H' and the arms $j$. This mode of construction is desirable for light or quick running screens because the weight of the actuating parts can be made smaller than in the case where the cylinder moves. The cylinder in this case is provided with suitable ports near the middle, which serve to admit steam between the pistons.

In Fig. 5 the screens A B C D are arranged in tandem order. The first and last are attached to a frame $l$, while B and C are secured to a frame $m$, and the two groups thus constituted are reciprocated by means of the cylinder H and piston-rod G, as in the previous cases.

Fig. 6 shows the mode of applying a single actuating cylinder and piston so as to operate two series of screens A B C D and A' B' C' D'. By this arrangement a double screen having great capacity may be operated in a very small space.

Fig. 7 shows the mode of operating a single screen or concentrating-table by means of my improved devices. The screen or table A is attached to the piston-rod and reciprocates with it. The cylinder also reciprocates, but always in the contrary direction. It is made to weigh exactly as much as the screen A and its attachments, so that it acts as a proper counterbalance, having the same inertia or momentum. The equalizing-levers E may be placed as shown, or they may be arranged in a horizontal plane, as in Fig. 4. When it is desired to have the movement of the screen or table A terminated with a positive shock or bump, a bumper-block $n$ may be interposed between the cylinder and the table, as shown. This arrangement is very suitable for the bumping-tables or separators employed for separating gold, &c., from finely-ground ore and slimes.

Fig. 8 shows the adaptation of my devices to a vertical screening or jigging apparatus. The weight of the screen or jig-pan A is balanced by the weight of the cylinder H through the medium of the levers E. The cylinder thus serves as a counterbalance, as in the previous case. (Shown in Fig. 7.) The levers E, however, have greater work to do than in any of the previous cases. In addition to equalizing the movements of the cylinder and piston, as in the other figures, they also support the weight of all the moving parts. Thus the standards $p$ become the supports of the entire machine.

While numerous other applications of my invention may be made to various forms of screening, jigging, and separating machines which operate by vibratory or reciprocating movement, the foregoing are deemed sufficient to clearly show the nature of my invention.

What I claim as new, and wish to secure by Letters Patent, is—

1. A screening or concentrating machine constructed in two movable parts having independent bearings, motor mechanism embodying a movable cylinder and a piston, one of said parts being connected to the piston and the other to the cylinder, whereby said parts are caused to move simultaneously in opposite directions, substantially as described.

2. A screening or concentrating machine constructed in two movable parts having independent bearings, motor mechanism embodying a movable cylinder and a piston, one of said parts being connected to the piston and the other to the cylinder, whereby said parts are caused to move simultaneously in opposite directions, and equalizing mechanism connecting said movable parts, substantially as described.

3. A screening or concentrating machine comprising a screen member, a counterbalance having weight approximately equal thereto, and motor mechanism embodying a movable cylinder and a piston which operate to move said parts simultaneously in opposite directions, substantially as described.

4. A screening or concentrating machine comprising a screen member, motor mechanism embodying a movable cylinder and a piston, and mechanism operatively connecting the screen member with said piston and cylinder, respectively, the combination presenting two counterbalanced reciprocating parts moving simultaneously in opposite directions, substantially as described.

5. A screening or concentrating machine comprising a screen member, motor mechanism embodying a movable cylinder and a piston, mechanism operatively connecting the screen member with said piston and cylinder, respectively, the combination presenting two counterbalanced reciprocating parts moving simultaneously in opposite directions, and equalizing mechanism connecting said movable parts, substantially as described.

6. In a screening or concentrating machine having a reciprocating motion, a direct-acting motor having a piston for operating said machine, said piston being arranged to cut off before the completion of its stroke in either direction whereby to trap the elastic fluid in the ends of the cylinder to form a cushion, as and for the purpose described.

7. A screening or concentrating machine constructed in two movable parts having independent bearings, motor mechanism embodying a cylinder and a piston having direct connection with said movable parts for reciprocating them simultaneously in opposite directions and mechanism for equalizing the motion of the two parts, substantially as described.

8. A screening or concentrating machine comprising a screen member, a counterbalance having weight approximately equal thereto and a motor exerting force simultaneously in opposite directions and embodying a cylinder and a piston directly connected to and operating to correspondingly reciprocate said parts, substantially as described.

CALVIN W. PARSONS.

Witnesses:
D. B. REPLOGLE,
A. R. SIMRELL.